US006287359B1

(12) United States Patent
Erhardt et al.

(10) Patent No.: US 6,287,359 B1
(45) Date of Patent: *Sep. 11, 2001

(54) GRANULE MIXTURES COMPOSED OF COATED AND NON-COATED FERTILIZER GRANULES

(75) Inventors: Klaus Erhardt, Leimen; Klaus Horchler von Locquenghien; Reinhardt Hähndel, both of Limburgerhof; Jürgen Dressel, Neuhofen; Hans Lang, Limburgerhof, all of (DE)

(73) Assignee: K+S Aktiengesellschaft, Kassel (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/117,180
(22) PCT Filed: Jan. 29, 1997
(86) PCT No.: PCT/EP97/00378
 § 371 Date: Jul. 29, 1998
 § 102(e) Date: Jul. 29, 1998
(87) PCT Pub. No.: WO97/28103
 PCT Pub. Date: Aug. 7, 1997

(30) Foreign Application Priority Data

Feb. 2, 1996 (DE) .............................................. 196 03 739

(51) Int. Cl.$^7$ ................................................... A01N 25/00
(52) U.S. Cl. ........................................................ 71/64.07
(58) Field of Search ........................... 523/200; 71/64.02, 71/64.07

(56) References Cited

U.S. PATENT DOCUMENTS

| | | | |
|---|---|---|---|
| 4,015,970 | * 4/1977 | Hennart | 71/11 |
| 4,142,885 | 3/1979 | Heumann et al. | |
| 4,657,576 | 4/1987 | Lambie | |
| 4,881,963 | * 11/1989 | Fujita | 71/64.07 |
| 5,043,007 | * 8/1991 | Davis | 71/80 |
| 5,133,797 | 7/1992 | Akira Mahara et al. | |
| 5,147,442 | * 9/1992 | Kosuge | 71/64.07 |
| 5,310,785 | * 5/1994 | Hayakawa | 525/7 |
| 5,538,531 | * 7/1996 | Hudson | 71/28 |
| 5,628,813 | * 5/1997 | Chen | 71/64.07 |
| 5,645,624 | * 7/1997 | Naka | 71/64.07 |
| 5,698,002 | * 12/1997 | Hudson | 71/28 |
| 5,852,109 | * 12/1998 | Makino | 524/811 |

FOREIGN PATENT DOCUMENTS

| | | |
|---|---|---|
| 40 15 345 | 11/1990 | (DE) . |
| 0 184 869 | 6/1986 | (EP) . |
| 0 1884 869 | 6/1986 | (EP) . |
| 0 337 298 | 10/1989 | (EP) . |
| 0 661 250 | 7/1995 | (EP) . |

OTHER PUBLICATIONS

Abstract only, DE 40 15 345, Nov. 29, 1990.
Ullmann's Encyclopedia of Industrial Chemistry, Fifth Ed., vol. A 10, (1987) pps 363–369.

* cited by examiner

*Primary Examiner*—Paul R. Michl
(74) *Attorney, Agent, or Firm*—Oblon, Spivak, McClelland, Maier & Neustadt, P.C.

(57) ABSTRACT

Granule mixtures composed of
 a) 5 to 45% by weight of coated fertilizer granules (granules a), composed of
  a1) a core, comprising a customary fertilizer, and
  a2) a coat, comprising a coat polymer, and
 b) 55 to 95% by weight of non-coated fertilizer granules, comprising a customary fertilizer (granules b).

25 Claims, No Drawings

GRANULE MIXTURES COMPOSED OF COATED AND NON-COATED FERTILIZER GRANULES

The present invention relates to granule mixtures composed of
- a) 5 to 45% by weight of coated fertilizer granules (granules a), composed of
  - a1) a core, comprising a customary fertilizer, and
  - a2) a coat, comprising a coat polymer, and
- b) 55 to 95% by weight of non-coated fertilizer granules, comprising a customary fertilizer (granules b)

and to fertilization methods in which the granule mixtures are used.

Fertilizer granules which are not coated are generally known and described, for example, in Ullmann's Encyclopedia of Industrial Chemistry, 5th Edition 1987, Volume A10, pages 363 to 369. The disadvantage of these fertilizer granules is the fact that the fertilizing agents, which are normally salts, are rapidly released from these granules, which results in a high nutrient concentration in the soil over a short period. Frequently, such high amounts cannot be taken up by the plants immediately. In this case, there is a danger of the nutrients being fixed in the soil, in which case they are no longer available to the plants or are leached out and reach the ground water, which is to be avoided for water conservation reasons. Moreover, the high salt concentrations, which are observed temporarily, may damage the plants and cause, for example, stunted growth.

Even when large amounts of fertilizer are applied, the concentration of fertilizing agent in a form that can be utilized by the plants drops so rapidly in this type of fertilization that it is too low even a short time after fertilization, ie. suboptimal for plant growth, and fertilization has to be carried out repeatedly within a comparison period. Not only does this mean more work, but one is also faced with the problem of the fertilizer particles adhering to the leaf axils, where they result in chemical burns.

To overcome these disadvantages, "slow-release" fertilizers were developed, which release the fertilizing agent in a form which is tolerated by plants over a prolonged period, for example over an entire vegetation period, in an amount which is better adapted to the nutrient requirements of the plant in the course of time.

These slow-release fertilizers are, for example, fertilizer granules which are coated with a polymer coat. Such fertilizers are known, for example, from Ullmann's Encyclopedia of Industrial Chemistry, 5th Edition 1987, Volume A10, pages 367 to 369.

Until now, it has been assumed that the rate at which the fertilizing agents are released is adapted satisfactorily to the changing nutrient requirements of the plants only when the majority of the granule particles are coated, and this is why the German Düngemittelverordnung [German Fertilizer Regulation] in its version of Jul. 9, 1991, § 2, in conjunction with Table 3 (cf. Das Düngemittelrecht [Fertilizer Law], edition 1992, by Günter Kluge and Georg Embert, Landwirtschaftsverlag GmbH, Münster-Hiltrup, 1992, pages 21 and 62) and the Verordnung zur Änderung düngemittelrechtlicher Vorschriften [Regulation for the Amendment of Provisions concerning Fertilizer Law] of Aug. 22, 1995 (Bundesgesetzesblatt [Federal Law Gazette], Year 1995, Part I, pages 1060 to 1071) provides that only those non-coated NPK fertilizers may be labelled as "EEC fertilizers" (and hence do not require separate licensing) where the fertilizer-coated granules amount to at least 50%.

The disadvantage of the granule mixtures with a high proportion of coated granules is the high price, due to the relatively complicated production of the coated granules (in general, the starting material for the production of the coated granules are non-coated customary fertilizer granules, which are coated with solution or dispersion of the coat polymer).

It is an object of the present invention to develop controlled-release fertilizers which are less expensive than the known ones and whose release rate is adapted with a view to the nutrient requirements of the plants in the course of time.

We have found that this object is achieved by the granule mixtures defined at the outset.

The granule mixtures according to the invention comprise
- a) 5 to 45, preferably 15 to 40, % by weight of polymer-coated fertilizer granules (granules a) composed of
  - a1) a core, comprising a customary fertilizer agent, and
  - a2) a coat, comprising a coat polymer, and
- b) 55 to 95, preferably 60 to 85, % by weight of non-coated fertilizer granules, comprising a customary fertilizer agent (granules b).

Granules (a) are generally known and described, for example, in Ullmann's Encyclopedia of Industrial Chemistry, 5th Edition 1987, Volume A10, pages 367 to 368.

Customary fertilizers which generally essentially constitute the core (a1) are, for example, single-constituent or else compound fertilizers which comprise nutrients such as nitrogen, potassium or phosphorus in the form of their salts, either individually or, if desired, in combination. Examples are NP, NK, PK and NPK fertilizers, such as nitrochalk, ammonium sulfate, ammonia sulfur-nitrate and urea.

Furthermore, the core (a1) may comprise, besides the abovementioned main constituents, secondary nutrients, such as Ca, B and/or Mg, trace elements, such as Fe, Mn, Cu, Zn and/or Mo in minor quantities, ie. usually in amounts of from 0.5 to 5% by weight, and other additives, such as crop protection agents, eg. insecticides or fungicides, growth regulators or nitrification inhibitors.

The coat (a2) is generally essentially composed of customary coat polymers, such as polyethylene, polypropylene, PVC, polyvinylidene chloride, vinyl chloride/vinylidene chloride block copolymers, (aliphatic and/or aromatic) polurethane [sic], polyvinyl acetate, polyacrylate, polyvinyl alcohol, polyvinylpyrrolidone, polyacrylamide, polyacrylic acid, urea/formaldehyde and melamine/formaldehyde resins, polyethylene oxide and polyethyleneimine, maleic anhydride/styrene block copolymers, ethylene/vinyl acetate/Co [sic] block copolymers, terpolymers based on ethylene/vinyl chloride and, for example, acrylic acid, linseed oil and soya oil block copolymers crosslinked with cyclopentadiene or butadiene, ethylene/acrylic acid block copolymers, polylactic acid, poly-caprolactone, polyesters, polyhydroxybutyric acid, hydroxypropylcellulose, polyglycolic acid, polyhydroxyvaleric acid, polyas-partic acid and paraffin waxes, phthalic esters of fatty alcohols, rosin, and metal salts of fatty acids.

Mainly suitable as coat polymers are carboxyl-carrying ethylene block copolymers where the carboxyl groups may also be present in the form of their salts, the carboxyl-carrying ethylene block copolymer being composed of
- a2.1) 75 to 90% by weight, preferably 15 to 25% by weight, of ethylene and
- a2.2) 10 to 25% by weight, preferably 15 to 25% by weight, of an α-olefinically unsaturated $C_3$- to $C_8$-carboxylic acid.

Suitable monomers (a2.2) are, in particular, acrylic acid, methacrylic acid, crotonic acid, maleic acid, fumaric acid or itaconic acid and mixtures of these.

The carboxyl-carrying ethylene block copolymers preferably have a Melt Flow Index (MFI) of from 1 to 25, particularly preferably 5, from 8 to 15 (measured at 160° C. and 325 Kp). The MFI indicates the amount of polymer melt in grams which can be forced through a nozzle of specific dimensions with a specific expenditure of force (load) at a specific temperature and time. The Melt Flow Indices (MFI units) are determined in accordance with the standard protocols ASTM D 1238-65 T, ISO R 1133-1696 (E) or DIN 53 735 (1970), which are identical with regard to each other.

The carboxyl-carrying ethylene block copolymers preferably have a melting range whose melting end ($T_{SE}$) is above 80° C., preferably above 110° C. In general, the $T_{SE}$ does not exceed 200° C. The $T_{SE}$ can be determined for example by the differential scanning calorimetry (DSC) method, the procedure usually being carried out in accordance with the protocol of DIN53765.

The carboxyl-carrying ethylene block copolymers furthermore preferably have a glass temperature ($T_G$) of below 50° C., preferably from −20 to +20° C., and no glass temperature of above 50° C. The $T_G$ is usually also determined by the DSC method in accordance with DIN53765.

All or some of the carboxyl groups of the carboxyl-carrying ethylene block copolymers are preferably present in the form of their salts, preferably in the form of the zinc, alkali metal, alkaline earth metal or ammonium salts, the sodium or ammonium salts being particularly preferred.

Especially suitable ammonium salts are those which are derived from ammonia, a mono-, di- or trialkanolamine having in each case 2 to 18 C atoms in the hydroxyalkyl radical, preferably 2 to 6 C atoms, or mixtures of the abovementioned alkanolamines, or a dialkylmonoalkanolamine having in each case 2 to 8 C atoms in the alkyl and hydroxyalkyl radical, or mixtures of these. Examples are diethanolamine, triethanolamine, 2-amino-2-methyl-1-propanol or dimethylethanolamine.

It is especially advantageous for 40 to 100, particularly preferably 70 to 90, % of the carboxyl groups to be present in the form of their salts.

The coats (a2) can furthermore comprise salts which are generally added to fertilizers as trace elements, ie., for example, salts of Mg, Fe, Mn, Cu, Zu, Mo and/or B. The coats may comprise 0.1 to 5% by weight of these salts, based on the coat polymer.

Furthermore, the coats (a2) may comprise other additives, such as crop protection agents, eg. insecticides or fungicides, growth regulators or nitrification inhibitors, usually in a total amount of from 0.1 to 5% by weight, based on the coat polymer.

In addition, substances which act to control the release of the fertilizers can also be added to the coats (a2). These are mainly lignin, starch and celluloses or silicates. They amount for example to 0.1 to 20% by weight, preferably 0.1 to 5% by weight, based on the coat polymer.

Normally, the granules (a) comprise
50 to 99.5% by weight of a fertilizer agent and
0.5 to 50% by weight of a coat polymer.

The granules (a) can be obtained by generally known processes. Expediently, a procedure is followed in which the coat polymers are applied to fertilizer granules which act as starting material in the form of melts, solutions or dispersions.

Suitable fertilizer granules which act as starting materials suitable for the production of the granules (a) are generally known granules of organic or mineral fertilizers (cf. Ullmann's Encyclopädie [sic] of Industrial Chemistry, 5th Edition 1987, Volume A 10, pages 374 to 385), which consist of the substances of which the core (a1) is composed.

The solutions or dispersions of the carboxyl-carrying ethylene block copolymers are particularly advantageously applied by spraying on at, generally, 10° C. to 110° C.

To avoid incipient solution of the fertilizer granules which act as starting material when applying an aqueous dispersion or solution, only a limited amount of the solution or dispersion is applied per unit time, and measures are taken so that the water can evaporate rapidly.

Expediently, a procedure is followed in which a fluidized bed, which is produced by fluidizing the fertilizer granules which act as starting materials by means of fluidizing gas, is sprayed with the solutions or dispersions at from 10 to 110° C., preferably 30 to 70° C. After the solution or dispersions have been sprayed on, the fluidized bed is generally maintained until the solvent, or the dispersing medium, is evaporated.

Such fluidized-bed coating methods are generally known and described in U.S. Pat. No. 5,211,985 for the production of coated fertilizer granules. Especially uniform and thin coats can be produced by means of this process.

The coat polymers are advantageously employed in the form of aqueous dispersions.

Granules (a), which impart a particularly advantageous profile of characteristics to the granule mixtures according to the invention, in particular regarding the resistance to mechanical stress and the tendency to agglomerate upon prolonged storage, are obtained when the fertilizer granules which act as starting materials are coated with an aqueous dispersion of a carboxyl-carrying ethylene block copolymer after the fluidized-bed application process has taken place. Suitable aqueous dispersions are, for example, the aqueous dispersions of ethylene block copolymer waxes which are described in DE-A-34 20 168.

The thickness of the coat (a2), which also has an effect on the diffusion rate at which the fertilizer agent diffuses out of the granules (a) is usually 10 to 200, preferably 10 to 100 μm.

If the coats (a2) comprise additives, trace elements or substances which act to control the release of the fertilizers, they are expediently added to the solutions, dispersions or melts.

To reduce the tendency of the coated fertilizer granules to agglomerate and cake, it may be advantageous to apply pulverulent solids such as talc, $SiO_2$, $Al_2O_3$ or $TiO_2$ after the granules have been coated with the carboxyl-carrying ethylene block copolymers.

The granules (b), the non-coated fertilizer granules, are, in principle, the same type of granules which are usually employed as fertilizer granules which act as starting materials in the production of the granules (a), it being possible for the composition of the fertilizer granules which act as starting materials and of the granules (b) to be identical or different regarding the substances they are composed of.

The producton of the granule mixtures according to the invention by means of mixing granules (a) and (b) is not critical and is generally carried out by mixing them in a customary mixing apparatus, such as a drum or a static mixer.

Both granules (a) and granules (b) generally have a maximum average diameter of from 0.5 to 10, preferably 0.7 to 5 mm. Their bulk density is normally at from 0.5 to 1.3 kg/l.

The respective bulk densities and diameters of the two granule types are advantageously selected to be approximately equal to prevent separation of the granule mixture according to the invention during transport or storage.

The granule mixtures according to the invention are usually applied to agriculturally and horticulturally exploited areas by the generally known methods (cf. Ullmann's Encyclopädie [sic] of Industrial Chemistry, 5th Edition 1987, Volume A 10, pages 398 to 401). Since the granule mixtures according to the invention are well tolerated by plants, they are not only suitable for fertilizing methods where the fertilizer is more or less uniformly applied to the area under cultivation, but also for spot deposition in the vicinity of the plant root.

In principle, the fertilizers according to the invention can be employed in all areas of crop production, such as agriculture and horticulture, mainly in fruit and vegetable production. Other crops whose growth can be promoted efficiently using the fertilizer according to the invention are potatoes, corn, sugar beet, oilseed rape, grapevines, lawns, tobacco and hops.

The fertilizers according to the invention are distinguished by the fact that they allow especially economical high-input utilization of agriculturally and horticulturally exploited areas, while avoiding pollution of the environment to a large extent.

The granule mixtures according to the invention are applied to the agriculturally or horticulturally exploited areas, or mixed into pots or containers for crops, by customary methods.

For optimal plant growth promotion, it is generally sufficient to apply the fertilizers according to the invention to the area under cultivation once per growth period (preferably at its beginning), because the nutrient requirements of the plant are in agreement with the release rate of the fertilizer agents.

When using the granule mixtures according to the invention as fertilizers, the cost-benefit ratio is particularly advantageous, because their profile of characteristics is at least not inferior to that of the granule mixtures where at least 50 % of the granules are coated with polymers, but their production costs are lower. The production costs of the prior-art granule mixtures are necessarily higher because the amount of more improved, coated granules is higher, and because non-coated granules are used as starting material for their production, and these granules amount to the rest of the granule mixture.

EXAMPLES

A. Production of the Granule Mixtures

I. Batchwise Production

A biconical mixer, made of metal and with a tank capacity of approximately 400 l and a maximum filling weight of 250 kg, was charged alternately and in portions with portions of approximately 10 kg of coated fertilizer (customary NPK fertilizer granules) composition: nitrogen (15 parts, calculated as N), phosphorus (5 parts, calculated as $P_2O_5$), potassium (20 parts, calculated as $K_2O$) and magnesium (2 parts, calculated as MgO), coated with an ethylene/acrylic acid block copolymer, 5% coat polymer based on the fertilizer, and portions of approximately 30 kg of non-coated fertilizer (customary NPK fertilizer) until the maximum filling quantity had been reached. At the end, the mixer contained 62.5 kg of coated and 187.5 kg of non-coated fertilizer. The mixer was then actuated for 1 minute and subsequently discharged. This gave a bulk blend in which the coated granules amounted to 25% and which was largely in the form of a homogeneous mixture.

II. Continuous Production

An inclined rotary drum (length approximately 3 m, diameter approximately 1 m) internally equipped with lifting blades was filled via two separate delivery chutes with the coated and non-coated fertilizers described under (I) in each case at the ratios given in Table 1. The inclination of the drum, its number of revolutions and the geometry of the internal equipment are adjusted to each other in such a way that the residence time of the fertilizer in the drum is approximately 10 to 15 minutes (average). What leaves the drum is a virtually homogeneous bulk blend.

B. Crop Production Tests

The tests were carried out on loamy sand at the Agricultural Experimental Station in Limburgerhof. The fertilizer was applied as one dressing in the form of a fertilizer placement but at 6 cm distance from the row and at a depth of 6 cm. This fertilization method, which has since been taken up in agricultural practice, dispenses with fertilizer application over the entire cropped area since the nutrients between the vegetables which are at a considerable distance from each other are not reached by the roots, or only at a later point in time. Nutrients which cannot be reached by the plant roots are liable to leaching or fixation in the soil. Application in the proximity of the plants thus promotes efficiency of the nutrients applied.

Fertilization in the experiments was carried out in each case using the fertilizer granule mixtures prepared in accordance with the examples. The fertilizer rates were 240 kg/ha N (=approximately 1600 kg/ha fertilizer), which corresponds to the requirement of these crops of nutrients from fertilizers.

Table 1 shows that equally high or higher yields were obtainable in both test crops (cauliflower and Chinese cabbage) when the coated granules amounted to 25%. In the variants without coated granules, the plants suffered from severe salt stress, caused by the fertilizers applied, so that their growth was not optimal. When fertilizers were applied in which the coated granules amounted to 75% or 100% they were tolerated well, but the release of nutrients for these rapidly growing crops with a high nutrient requirement was not sufficient at certain periods, so that yield at harvesting time was correspondingly lower.

TABLE 1

| Proportion [sic] of coated granules | Cauliflower | | Chinese cabbage [3]Yield [metric tonnes/ha] |
|---|---|---|---|
| | [1]Yiueld [metric tonnes/ha] | [2]Number of specimens with the best size per m$^2$ | |
| 0 | 41.1 | 2.17 | 43.2 |
| 25 | 47.4 | 2.26 | 45.1 |
| 50 | 44.9 | 2.17 | 44.7 |
| 75 | 43.3 | 1.97 | 40.4 |
| 100 | 34.7 | 0.60 | |

[1]Only the yield of the sizes generally used in the trade, "size 6", "size 8", "size 12", was taken into consideration.
[2]The best size is a "size 6"-cauliflower head, which is the size preferred by the trade; the number indicates the number of cauliflower heads in the best size which were harvested on one m$^2$ of area under cultivation.
[3]Only the harvest of classes 1 and 2 was taken into consideration.

We claim:

1. A granule mixture composed of
   5 to 45% by weight of coated fertilizer granules (granules a), composed of
      a1) a core, comprising a fertilizer, and
      a2) a coat, comprising a coat polymer, and
   b) 55 to 95% by weight of non-coated fertilizer granules, comprising a fertilizer (granules b),
      the coat polymers being polymers selected from the group consisting of polyethylene, polyvinylidene chloride, (aliphatic and/or aromatic) polyurethanes, linseed oil and soya oil block copolymers crosslinked with cyclopentadiene or butadiene, and ethylene/acrylic acid block copolymers.

2. A granule mixture as claimed in claim 1, granules (a) or (b) having a maximum average diameter of from 0.5 to 5 mm.

3. A granule mixture as claimed in claim 1, granules (a) comprising
80 to 99.5% by weight of a fertilizer and
20 to 0.5% by weight of a coat polymer.

4. A granule mixture as claimed in claim 1, the fertilizer being a single-constituent or compound fertilizer.

5. A granule mixture composed of
a) 5 to 45% by weight of coated fertilizer granules (granules a), composed of
  a1) a core, comprising a fertilizer, and
  a2 a coat, comprising a coat polymer, and
55 to 95% by weight of non-coated fertilizer granules, comprising a customary fertilizer (granules b), the coat polymer being a carboxyl-carrying ethylene block copolymer where the carboxyl groups may also be present in the form of their salts and the carboxyl-carrying ethylene block copolymer being constructed of
  b2.1) 75 to 90% by weight of ethylene and
  b2.2) 10 to 25% by weight of an α-olefinically unsaturated $C_3$- to $C_8$-carboxylic acid.

6. A granule mixture as claimed in claim 1, the coat (a2) having an average thickness of 1 to 200 μm.

7. A method of fertilizing fruit and vegetable crops or lawns, comprising applying an effective amount of the granule mixture as claimed in claim 1 to a fruit crop, a vegetable crop, or a lawn.

8. A granule mixture as claimed in claim 1, wherein granules (a) and granules (b) are present in respective amounts that are equivalent to amounts which provide synergistic yields of cauliflower or Chinese cabbage.

9. A method of fertilizing a crop comprising applying an effective amount of a granule mixture to a crop, wherein the granule mixture is composed of
a) 5 to 45% by weight of coated fertilizer granules (granules (a)), composed of
  a1) a core, comprising a fertilizer, and
  a2) a coat, comprising a coat polymer, and
b) 55 to 95% by weight of non-coated fertilizer granules, comprising a fertilizer (granules (b)), and
wherein granules (a) and granules (b) are present in respective amounts that are equivalent to amounts which provide synergistic yields of cauliflower or Chinese cabbage, and the crop fertilized is cauliflower or Chinese cabbage.

10. A granule mixture as claimed in claim 5, granules (a) or (b) having a maximum average diameter of from 0.5 to 5 mm.

11. A granule mixture as claimed in claim 5, granules (a) comprising
80 to 99.5% by weight of a fertilizer and
20 to 0.5% by weight of a coat polymer.

12. A granule mixture as claimed in claim 5, the fertilizer being a single-constituent or compound fertilizer.

13. A granule mixture as claimed in claim 5, the coat (a2) having an average thickness of 1 to 200 μm.

14. A granule mixture as claimed in claim 5, wherein granules (a) and (b) are present in respective amounts that are equivalent to amounts which provide synergistic yields of cauliflower or Chinese cabbage.

15. A method of fertilizing a crop comprising applying an effective amount of a granule mixture to a crop, wherein the granule mixture is composed of
a) 5 to 45% by weight of coated fertilizer granules (granules (a)), composed of
  a1) a core, comprising a fertilizer, and
  a2) a coat, comprising a coat polymer, and
b) 55 to 95% by weight of non-coated fertilizer granules, comprising a fertilizer (granules (b)),
  the coat polymers being polymers selected from the group consisting of polyethylene, polyvinylidene chloride, (aliphatic and/or aromatic) polyurethanes, linseed oil and soya oil block copolymers crosslinked with cyclopentadiene or butadiene, and ethylene/acrylic acid block copolymers.

16. The method as claimed in claim 15, granules (a) or (b) having a maximum average diameter of from 0.5 to 5 mm.

17. The method as claimed in claim 15, granules (a) comprising
80 to 99.5% by weight of a fertilizer and
20 to 0.5% by weight of a coat polymer.

18. The method as claimed in claim 15, the fertilizer being a single-constituent or compound fertilizer.

19. The method as claimed in claim 15, the coat (a2) having an average thickness of 1 to 200 μm.

20. A method of fertilizing a crop comprising applying an effective amount of a granule mixture to a crop, wherein the granule mixture is composed of
a) 5 to 45% by weight of coated fertilizer granules (granules (a)), composed of
  a1) a core, comprising a fertilizer, and
  a2) a coat, comprising a coat polymer, and
b) 55 to 95% by weight of non-coated fertilizer granules, comprising a fertilizer (granules (b)),
  the coat polymer being a carboxyl-carrying ethylene block copolymer where the carboxyl groups may also be present in the form of their salts and the carboxyl-carrying ethylene block copolymer being constructed of
  b2.1) 75 to 90% by weight of ethylene and
  b2.2) 10 to 25% by weight of an α-olefinically unsaturated $C_3$- to $C_8$-carboxylic acid.

21. The method as claimed in claim 20, granules (a) or (b) having a maximum average diameter of from 0.5 to 5 mm.

22. The method as claimed in claim 20, granules (a) comprising
80 to 99.5% by weight of a fertilizer and
20 to 0.5% by weight of a coat polymer.

23. The method as claimed in claim 20, the fertilizer being a single-constituent or compound fertilizer.

24. The method as claimed in claim 20, the coat (a2) having an average thickness of 1 to 200 μm.

25. A method of fertilizing fruit and vegetable crops or lawns, comprising applying an effective amount of the granule mixture as claimed in claim 5 to a fruit crop, a vegetable crop or a lawn.

* * * * *

UNITED STATES PATENT AND TRADEMARK OFFICE
CERTIFICATE OF CORRECTION

PATENT NO.    : 6,287,359 B1
DATED         : September 11, 2001
INVENTOR(S)   : Erhardt et al.

It is certified that error appears in the above-identified patent and that said Letters Patent is hereby corrected as shown below:

<u>Title page</u>,
The Notice information should read:
-- (*) Notice:  This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days. --

Signed and Sealed this

Seventh Day of May, 2002

*Attest:*

JAMES E. ROGAN
*Attesting Officer*     *Director of the United States Patent and Trademark Office*

UNITED STATES PATENT AND TRADEMARK OFFICE
CERTIFICATE OF CORRECTION

PATENT NO.     : 6,287,359 B1
DATED          : September 11, 2001
INVENTOR(S)    : Klaus Erhardt et al.

It is certified that error appears in the above-identified patent and that said Letters Patent is hereby corrected as shown below:

<u>Column 1,</u>
Line 60, "Verordnung zur Änderung d" should read -- Verordnung zur Änderung --;
Line 61, "üngenuttekrechtlicher" should read -- düngenuttekrechtlicher --.

<u>Column 2,</u>
Line 47, "Co [sic] block copolymers," should read -- CO [sic] block copolymers, --;
Line 51, "poly-caprolactone," should read -- polycaprolactone, --;
Line 53, "polyas-partic acid" should read -- polyaspartic acid --.

<u>Column 6,</u>
Table 1, line 45, "Yiueld [metric" should read -- Yield [metric --;
Line 60, "5 to 45% by" should read -- a) 5 to 45% by --.

<u>Column 7,</u>
Line 19, "a2 a coat," should read -- a2) a coat, --;
Line 20, "55 to 95% by weight" should read -- b) 55 to 95% by weight --;
Line 33, "amount of the gran" should read -- amount of the gran- --.

Signed and Sealed this

Twenty-sixth Day of November, 2002

*Attest:*

*Attesting Officer*

JAMES E. ROGAN
*Director of the United States Patent and Trademark Office*